United States Patent [19]
Kwon

[11] Patent Number: 5,293,899
[45] Date of Patent: Mar. 15, 1994

[54] FUEL TANK OF OIL HEATER

[75] Inventor: Oh-Kyoung Kwon, Seoul, Rep. of Korea

[73] Assignee: Samsung Electronics Co., Ltd., Suwon, Rep. of Korea

[21] Appl. No.: 931,337

[22] Filed: Aug. 18, 1992

[30] Foreign Application Priority Data

Aug. 21, 1991 [KR] Rep. of Korea ............... 91-13304

[51] Int. Cl.$^5$ ............................................. E03B 11/00
[52] U.S. Cl. .................................... 137/544; 137/573; 137/574; 137/590
[58] Field of Search ............... 137/544, 573, 574, 576, 137/590, 545; 220/563, 565, 4.12, 4.14, 4.15

[56] References Cited

U.S. PATENT DOCUMENTS

| | | | |
|---|---|---|---|
| 758,078 | 4/1904 | Tardine | 137/574 |
| 2,316,729 | 4/1943 | Tryon | 137/573 |
| 3,470,907 | 10/1969 | Shockey | 137/590 |
| 3,993,094 | 11/1976 | Spooner | 137/574 |
| 4,210,176 | 7/1980 | Emming | 137/574 |
| 5,141,179 | 8/1992 | Gautier | 137/574 |

*Primary Examiner*—A. Michael Chambers
*Attorney, Agent, or Firm*—Burns, Doane, Swecker & Mathis

[57] ABSTRACT

A fuel tank includes an inlet port communicating with a fuel decelerating section of the tank in which the inflowing fuel is decelerated. The decelerated fuel is delivered to a fuel intake compartment of the tank which contains a filter. The filtered fuel is then delivered to a fuel storage area of the tank which includes a hose leading to an outlet port. A buoyant member is mounted on the inlet end of the hose to enable that inlet end to rise to or near the surface of fuel in the tank. Sediment drains are provided in the bottom of the tank for removing sediment from the fuel intake compartment and the fuel storage area.

22 Claims, 5 Drawing Sheets

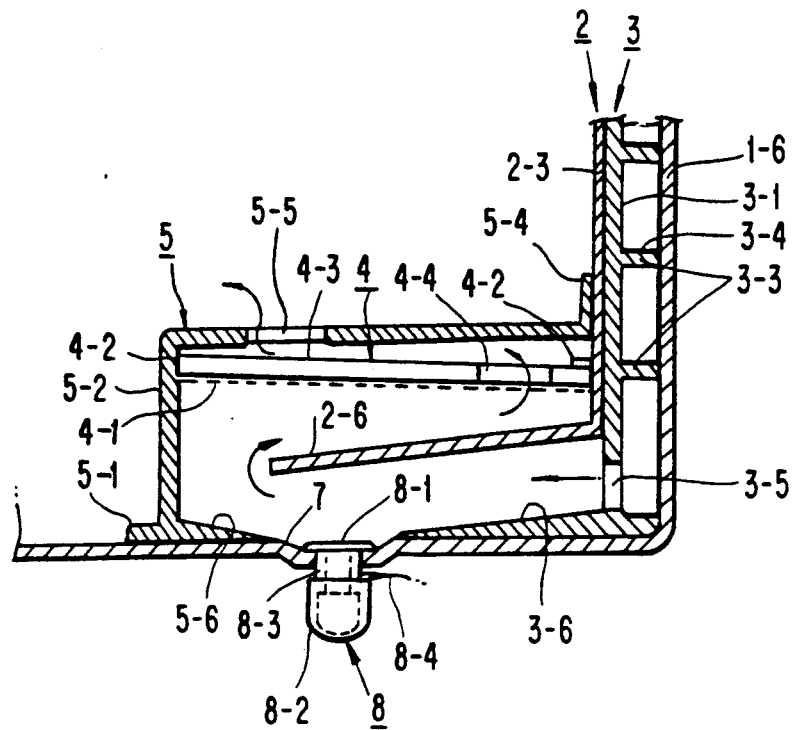
FIG. 6
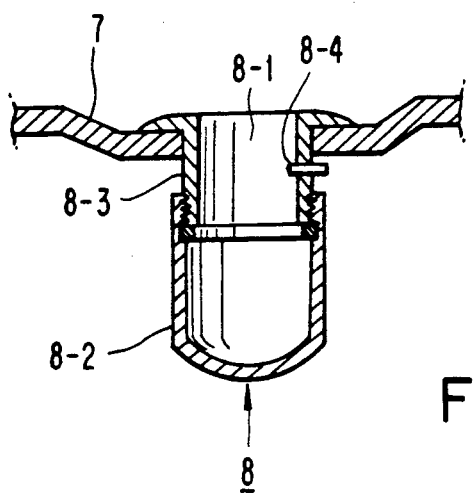
FIG. 7A
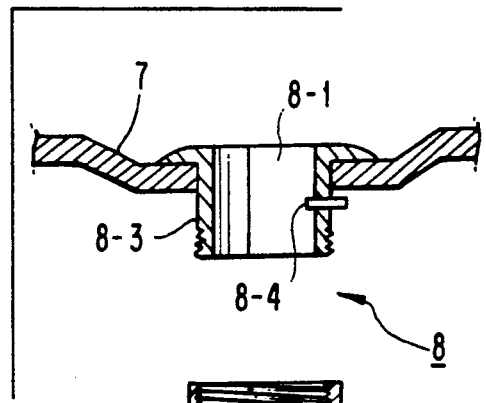
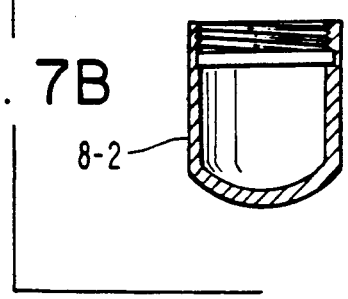
FIG. 7B

FUEL TANK OF OIL HEATER

BACKGROUND OF THE INVENTION

1. Field of the Invention

The present invention relates to a fuel tank for an oil heater, and more particularly to a fuel tank which enables only good quality fuel to be supplied to the burner of oil heater by preventing adulteration foreign objects during supply of oil into the burner.

The present invention further concerns a fuel tank for an oil heater which can prevent malfunction of the burner due to clogging of a fuel supply nozzle, thus maintaining appropriate combustion conditions for prevention of the generation of pollution and tars.

The present invention still further relates to a fuel tank of an oil burner which can make it easy to eliminate foreign objects flowing into the fuel tank.

2. Description of the Prior Art

The fuel tank of a conventional oil heater, as shown in FIG. 1 is composed of a symmetrical flange 70-3 of a front part 70-1 attached to another flange 70-4 of a rear part 70-2 by being welded thereto.

On a top wall 70-5 of the front part, there is provided a fuel intake 70-6 to which an intake filter 70-7 for the elimination of foreign objects from the oil is attached. On the flat bottom 70-8 of the tank, there is provided a drain for the elimination of sedimented foreign objects and on the lower part of a side wall, there is provided a fuel outlet 72 which is connected with a hose 71 reaching to the burner.

The conventional fuel tank 70 as constructed in this manner, though equipped with intake filter 70-7 for filtering foreign objects from the oil during fuel injection, has the tendency for foreign objects to be smeared at the intake filter due to the speed of the oil flowing into the tank, resulting in a clogging of the filter and insufficient filtering of foreign objects.

The conventional fuel tank also has the problem of foreign objects not being able to sediment quickly as the injected fuel shakes excessively due to the height difference between the fuel intake 70-6 and the bottom 70-8, resulting in some of the foreign objects not being sedimented but rather being supplied into the electronic pump P and burner B of the heater illustrated in FIG. 2.

Accordingly, the pumping capability of electronic pump P decreases due to the accumulation of foreign objects in the sophisticatated electronic pump and the electronic pump itself can be damaged due to the clogging of the fluid conduit of the electronic pump.

Furthermore, even if foreign objects can pass through the electronic pump P, the foreign objects can clog the nozzle (not shown) of the burner B or deteriorate the fuel supply function, causing a deterioration of heating capability as a well as generation of pollutions and tars due to incomplete combustion.

Still another problem is that, as the bottom 70-8 of fuel tank 70 is flat, the foreign objects cannot converge toward the drain and even if the foreign objects do converge, there is no way of telling how much of the foreign objects is accumulated, causing the user to lose the timing of eliminating the foreign objects.

SUMMARY OF THE INVENTION

Accordingly, in order to solve said conventional problems, the present invention provides the interior of the fuel tank with partitions having fuel inflow speed retardation part, fuel intake compartment and main storage area.

In fuel inflow speed retardation part, a fuel inflow route guiding means is installed for guiding the fuel poured in from a fuel intake, and also installed with fuel inflow speed ratardation means for establishing a phased descent of injected fuel, causing a decrease of inflowing speed of the fuel for the prevention of abrupt fluid movement of fuel.

In the fuel intake compartment installed on one lower side of said fuel inflow route guiding means, there is provided fuel inflow speed adjusting means having filtering means and a buoy buoyant hose for secondary filtering of foreign objects mixed in the inflowed fuel and for adjusting the inflowing speed of fuel into the main storage area.

In the main storage area which is connected to the fuel outlet, there is provided a buoyant hose including filtering means for supplying to the heater only the clean fuel located on the top of the stored fuel, resulting in supplying only foreign object-free fine quality of fuel to the burner.

Furthermore, a tilted area is provided on the bottom of the fuel tank for enabling sediment to travel toward a drain.

On the drain, there is provided foreign object sensing means to enable the presence of sediment to be known without opening the drain.

Accordingly, it is the main object of the present invention to eliminate completely the foreign objects mixed in the fuel being inflowed into the fuel tank for supplying only pure clean fuel to the burner.

It is another object of the present invention for the user to learn the need to clean the drain by sensing the quantity of foreign objects accumulated in the drain provided on the bottom of fuel tank.

BRIEF DESCRIPTION OF THE DRAWINGS

For a fuller understanding of the nature and objects of the invention, reference should be made to the following detailed description taken in conjunction with the accompanying drawings in which:

FIG. 6 is an enlarged sectional view of a part of FIG. 5B;

FIG. 7A is an enlarged sectional view of a drain; and

FIG. 7B is an enlarged sectional exploded view of the drain of FIG. 7A.

DETAILED DESCRIPTION OF A PREFERRED EMBODIMENT OF THE INVENTION

A detailed explanation about the preferred embodiment according to the present invention is given below.

Figure 1:
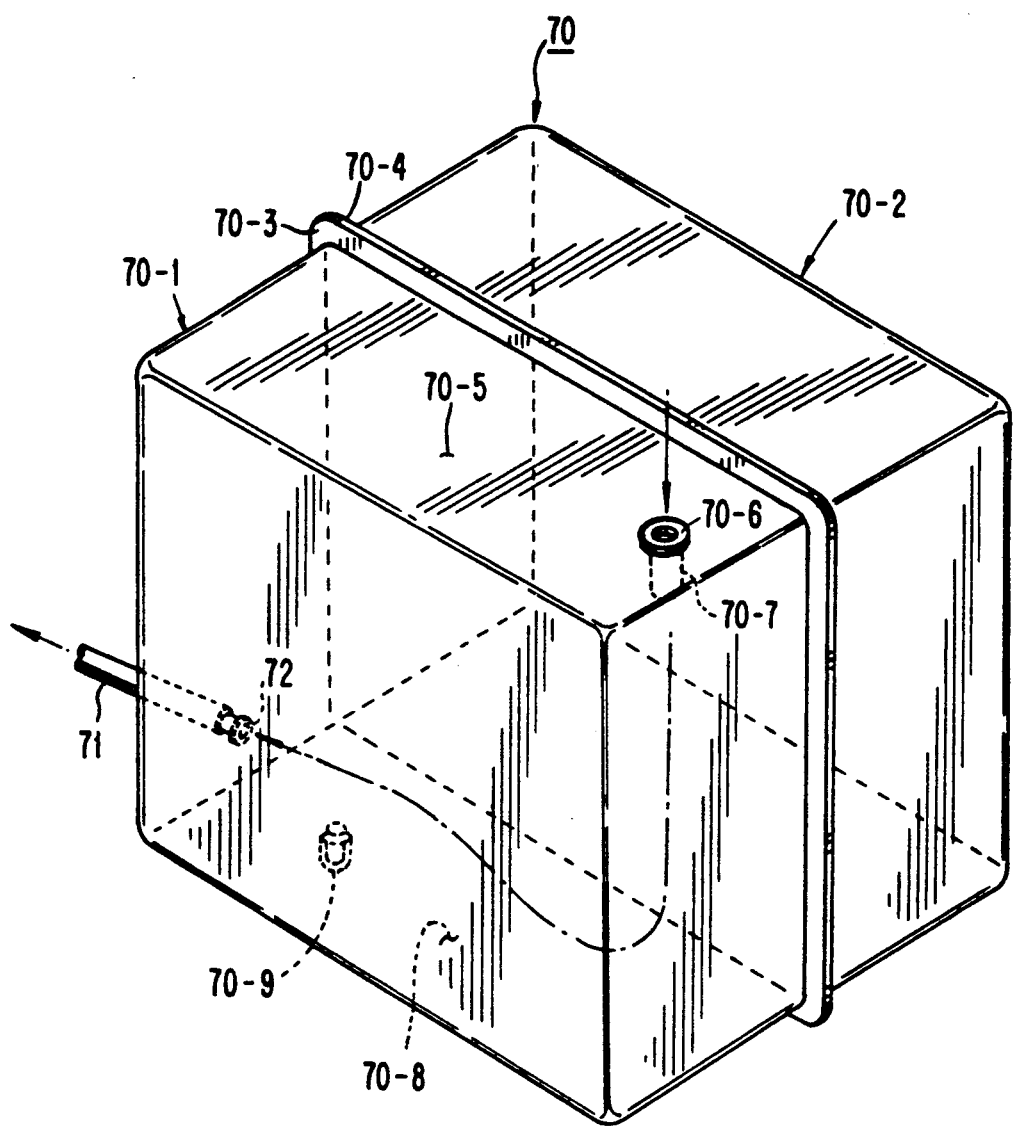
FIG. 1 is a perspective view of a conventional fuel tank.
Figure 2:
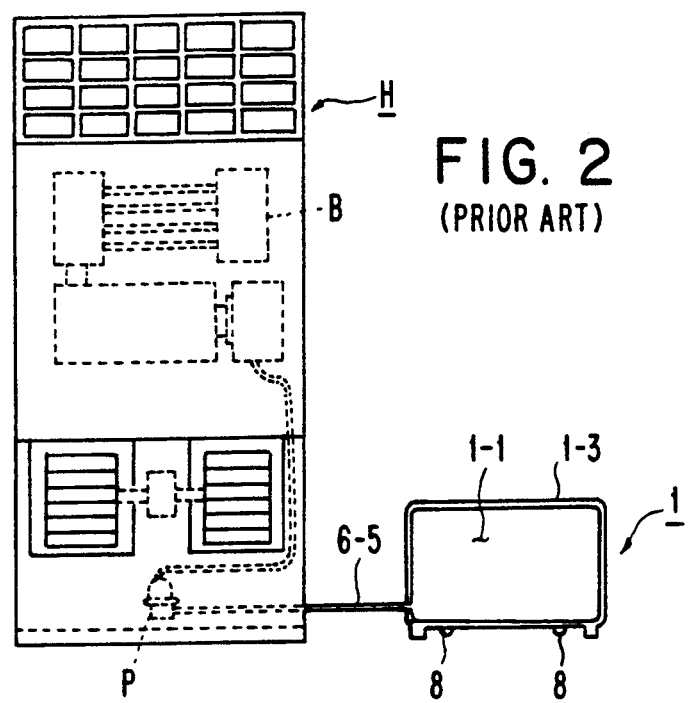
FIG. 2 is a side view of a fuel tank of a conventional hot air heater.
Figure 3:
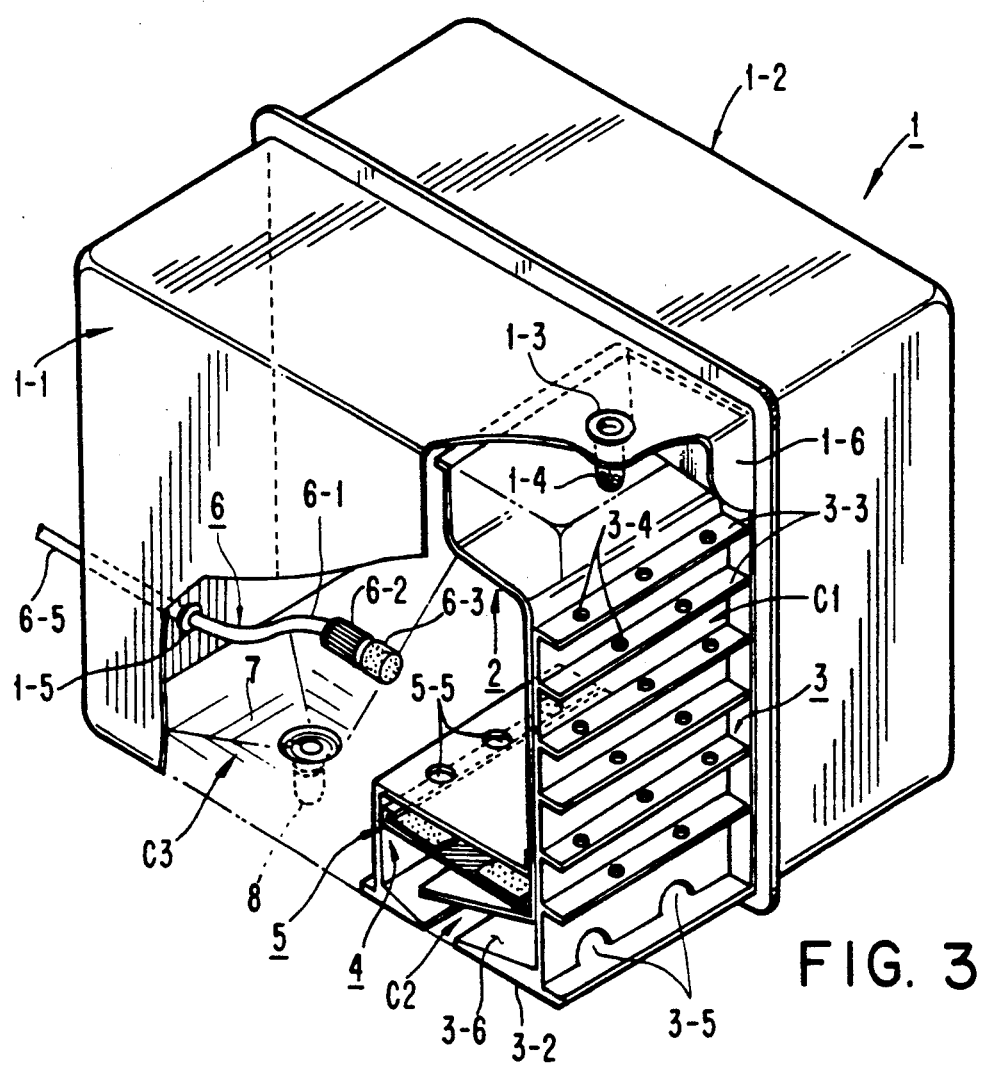
FIG. 3 is a partly cut-away perspective view of a fuel tank in accordance with the present invention.

The fuel tank 1 in accordance with the present invention, having a fuel intake port 1-3, intake filter 1-4 and fuel outlet port 1-5, is composed of front part 1-1 and rear part 1-2 as shown in FIG. 3.

Under the intake filter 1-4, there is provided a wall arrangement including a fuel inflow route guiding means 2 for partitioning the interior space of fuel tank 1 into fuel inflow speed retardation section C1, fuel intake compartment C2 and main storage area C2. The fuel inflow speed retardation section C1 and the fuel intake compartment C2 together define a fuel-receiving area.

On the side wall of fuel inflow route guiding means 2 and front part 1-1, there is provided fuel inflow speed retardation means 3 for establishing a phased descent of inflowing fuel.

The fuel intake compartment C2 is partitioned from main storage area C3 by a supporter 5 positioned on the lower side of said fuel inflow route guiding means 2. Within the fuel intake compartment C2 there is provided a fuel inflow speed adjusting means 4.

Furthermore, a fuel outlet 1-5 is connected to said main storage area C3 and the heater H is attached to buoy-type fuel supply means 6 for supplying fuel. On the bottom wall of said fuel intake compartment C2 and main storage area C3, there are provided inclined recesses 7 (see FIG. 5A) for the sedimenting foreign objects to be converged and under the extreme lower area of these inclined recesses 7 there are provided drains 8 equipped with means for sensing sedimented foreign objects.

Figure 4A:
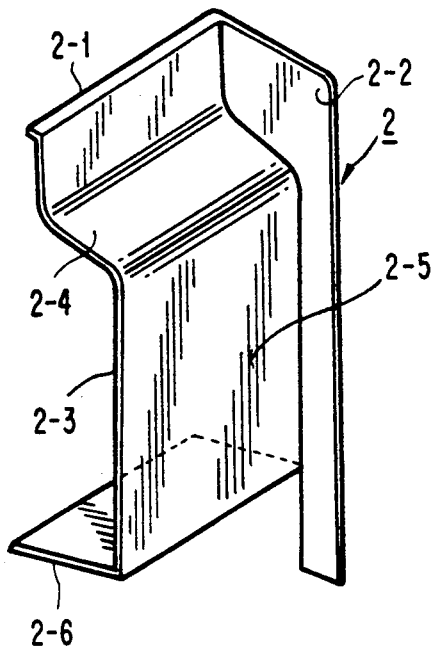
FIG. 4A is a perspective view of a fuel inflow route guiding means shown in FIG. 3.

FIG. 4A is a drawing for showing detailed construction of fuel inflow route guiding means 2.

The fuel inflow route guiding means 2 consists of flange 2-1 to be fixed to the upper wall of front part 1-1 of fuel tank 1, diaphragm member 2-2 located on the border of rear part 1-2 and fuel inflow guiding member 2-3 which includes curvature part 2-4, straight line part 2-5 to which the fuel inflow speed retardation panel 3 is fixed and an inclined plane 2-6 for blocking the rising of foreign objects inside the fuel inflow compartment C2.

Figure 4B:
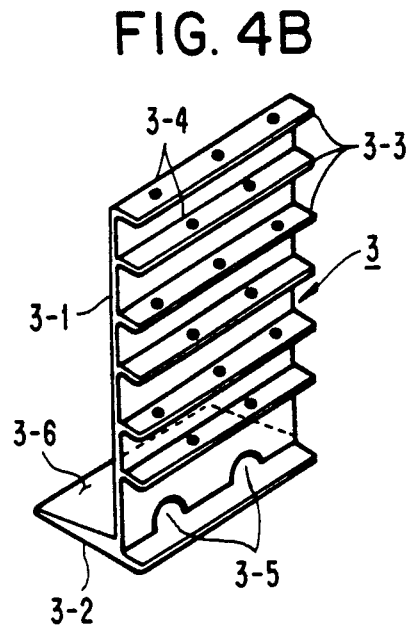
FIG. 4B is a perspective view of a fuel inflow speed retardation means shown in FIG. 3.

FIG. 4B is a drawing for showing the shape of fuel inflow speed retardation means 3, which consists of straight line member 3-1 for being fixed to straight line part 2-5 of said fuel inflow route guiding means 2 and horizontal member 3-2 joining the bottom of fuel intake compartment C2.

The straight line member 3-1 has several protruding ribs 3-3 in which many fuel passage holes 3-4 are provided, and the passage holes 3-4 on ribs are non-aligned vertically.

On the bottom of straight line member 3-1 there are provided a fuel passage openings 3-5 and on part of the upper side of horizontal member 3-2 there is provided an inclination 3-6 for sedimenting foreign objects to be accumulated easily toward the drain.

Figure 4D:
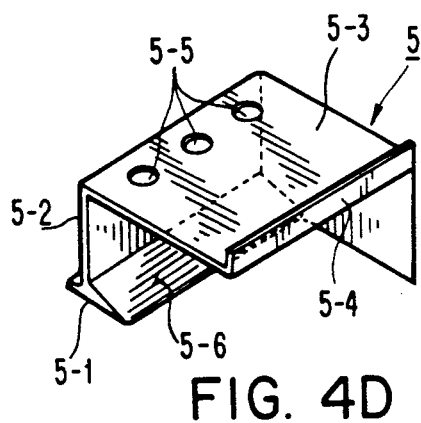
FIG. 4D is a perspective view of a supporter of a fuel inflow speed adjusting means shown in FIG. 3.
Figure 4C:
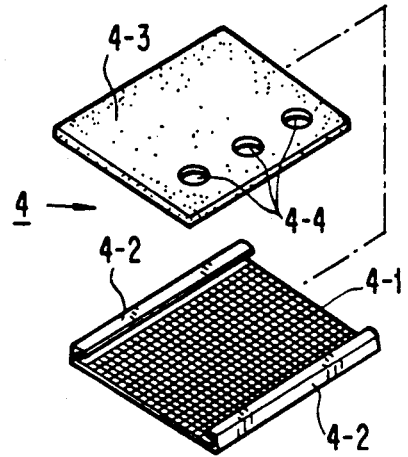
FIG. 4C is an exploded perspective view of a fuel inflow speed adjusting means shown in FIG. 3.

FIG. 4C is a drawing for showing in detail fuel inflow speed adjusting means 4.

The fuel inflow speed adjusting means 4 is made of a filtering means 4-1 (for example, meshed filter or the like) having guides 4-2 on both sides. A sheet-like cartridge of buoyant material 4-3 is inserted in the guides. On one side of buoyant material 4-3 there are provided fuel passage holes 4-4.

FIG. 4D is a drawing for showing in detail a supporter 5 of said fuel inflow speed adjusting means 4.

This supporter 5 forms, together with the bottom 1 of the fuel tank, the fuel intake compartment C2. The supported 5 comprises a fixed supporting part 5-1, a vertical diaphragm 5-2 and a horizontal diaphragm 5-3.

On the Horizontal diaphragm 5-3, there is provided a flange 5-4 joined to the straight line part 2-5 of said fuel inflow route guiding means 2. Fuel passage holes 5-5 on the horizontal diaphragm 5-3 are horizontally offset from the fuel passage holes 4-4 on buoyant material 4-3 of said fuel inflow speed adjusting means 4, and on the inner upper side of supporting part 5-1 there is provided a tilted part 5-6 for easy accumulation of sedimenting foreign objects toward the respective drain 8. The supporter 5-5 includes holes 5-5 which define an outlet of the fuel intake compartment. The holes 5-5 are disposed vertically above, and horizontally spaced from, the holes 4-4 in the sheet 4-3.

Figure 4E:
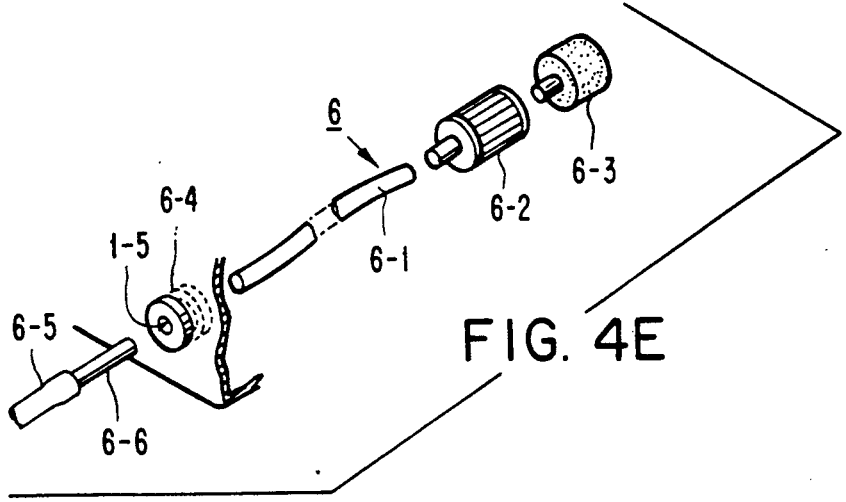
FIG. 4E is an exploded perspective view of a buoyant fuel supply means shown in FIG. 3.

FIG. 4E is a drawing for showing in detail the buoyant fuel supply means 6.

This buoyant fuel supply means 6 comprises a hose 6-1, a filtering means 6-2 (for example, corrugated filtering cloth) and buoyant material 6-3 in sequential order. The hose has a length long enough for filtering means 6-2 to extend upwardly while being submerged completely when the main storage area C3 is filled to 90% with fuel and is assembled with connecting tube 6-6 of fuel supply hose 6-5 inserted into a packing 6-4.

FIG. 7A and FIG. 7B are drawings of a drain 8 in detailed configuration.

The drain 8 consists of a socket 8-1 fixed in the middle of its inclined recess and a cup 8-2 connected to the socket. The tubular body 8-3 of socket 8-1 is equipped with foreign object sensing means 8-4.

The operational effect of the present invention so constructed in this manner is explained as below.

Figure 5A:
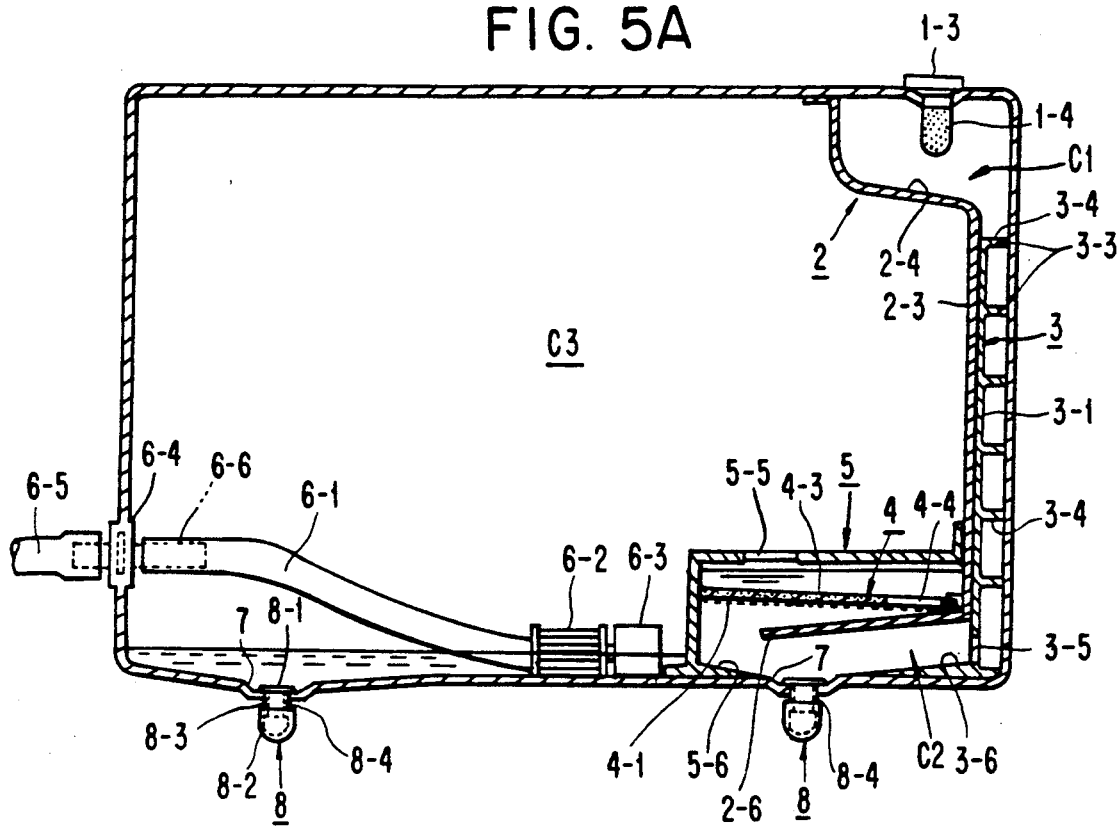
FIG. 5A is a vertical sectional view taken through FIG. 3 when the fuel tank is nearly empty.

FIG. 5A is a drawing for illustration when there is little fuel in the inside of fuel tank 1.

At this moment, buoyant fuel supply means 6 reaches to the bottom of fuel tank 1, which implies there is little fuel, and as there is little fuel, fuel should be supplied to the tank.

Accordingly, when fuel is supplied through fuel intake 1-3, the fuel is filtered at intake filter 1-4 in the first place and passes the curvature part 2-4 of fuel inflow guiding member 2-3 in fuel inflow route guiding means 2 and passes through fuel passage hole 3-4 of fuel inflow speed retardation means 3.

At this moment, as fuel passage holes 3-4 are positioned horizontally offset on ribs 3-3 so that the fuel travels non-radially. Hence, the fuel speed decelerates drastically by the time that the fuel reaches fuel passage cut-open part 3-5 of straight line member 3-1, resulting in a decrease in movement of any foreign objects in the fuel.

The fuel which passes through fuel passage cut-open part 3-5 is inflowed into fuel intake compartment C2, and the inflowed fuel is filtered secondly by filtering means 4-1 of fuel inflow speed adjusting means 4, and thereafter passes fuel passage holes 4-4 of buoyant material 4-3 and fuel passage holes 4-4 of supporter 5, and finally inflows into main storage C3. Note from a comparison of FIGS. 5A and 5B that the buoyant material 4-3 enables the speed adjusting means to rise.

Eventually, the foreign objects filtered by filtering means 4-1 converge to a drain 8 located on the extreme lower end of tilted part 7 provided on the bottom wall of fuel intake compartment C2, after gravitating along the tilted part 2-6 of fuel inflow route guiding means 2 and tilted part 5-6 of supporter 5 and tilted part 3-6 of inflow speed retardation means 3.

Figure 5B:
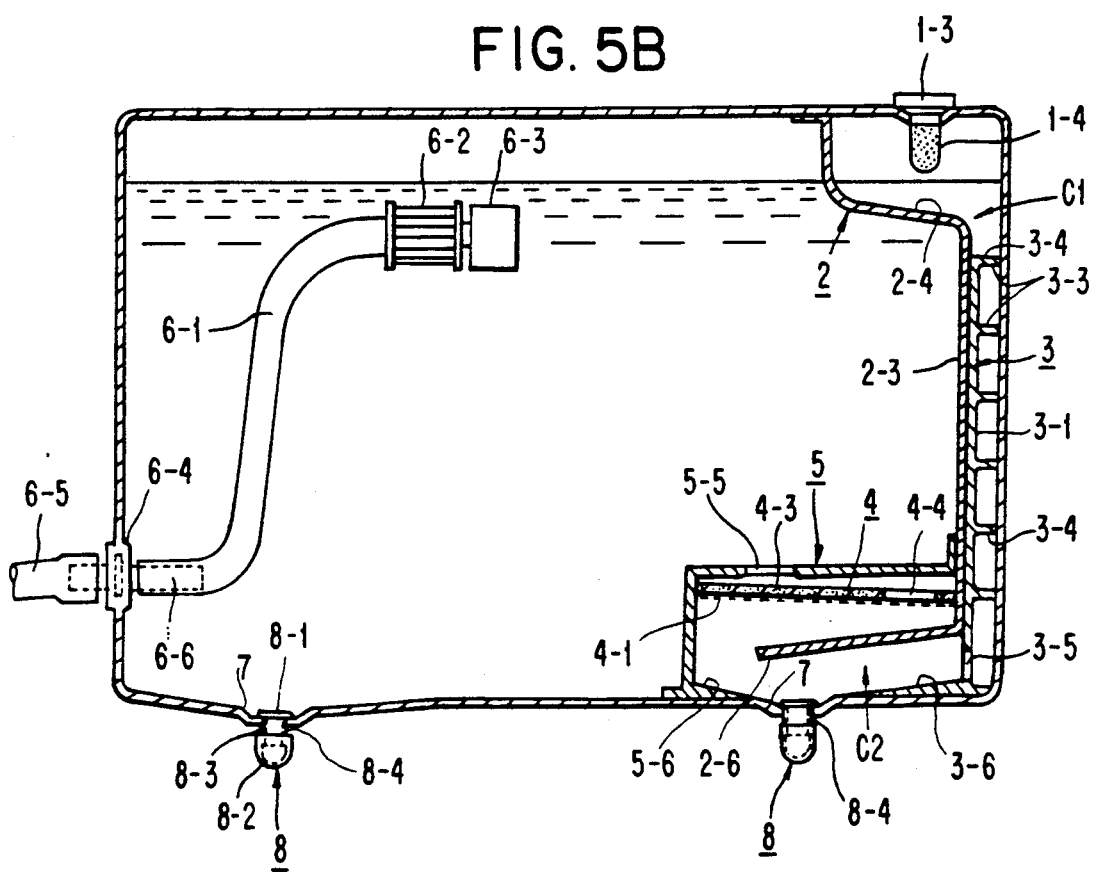
FIG. 5B is a view similar to FIG. 5A when the fuel tank is full.

Afterwards, the fuel inflowed into main storage area C3, as illustrated in FIG. 5B, is thirdly filtered by filtering means 6-2 of buoyant fuel supply means 6 before traveling through the fuel outlet 1-5 to heater H.

At this point, foreign objects relatively heavier in density than the fuel inflowed into main storage area C3 converge to a drain 8 located on the extreme lower end of tilted part 7 mounted on the bottom wall of main storage C3.

From the foregoing, it will be understood that the invention supplies to a heater H only pure quality of fuel, thus preventing functional deterioration, or clogging of the burner or of an electronic pump and the like for maintaining an appropriate combustion efficiency and preventing the generation of pollutants and tars during combustion.

The invention also eliminates foreign objects by means of the drains which are equipped with foreign object sensing means 8-4 so that the user can easily know when it is time to clean the drain.

What is claimed is:

1. A fuel tank comprising:
   a tank body having a liquid fuel intake port communicating with an interior of said tank at an upper portion of said interior, and
   a wall arrangement dividing said tank interior into a fuel receiving area and a fuel storage area,
   said fuel receiving area communicating with said fuel intake port and including means for conducting a downward flow of fuel from said intake port while decelerating the speed of such downward flow of fuel,
   said fuel storage area communicating with a downstream end of said fuel receiving area at a location disposed below said fuel intake port, and
   a fuel outlet port communicating with said fuel storage area for withdrawing fuel therefrom, said fuel outlet port disposed below said fuel inlet port.

2. A fuel tank according to claim 1 including a filter disposed at said fuel intake port and disposed upstream of said means for conducting and decelerating the downward flow of fuel.

3. A fuel tank according to claim 1, wherein said fuel receiving area extends downwardly from said fuel inlet port along a side of said tank from a top to a bottom of said side.

4. A fuel tank according to claim 1, wherein said means for conducting and decelerating a downward flow of fuel includes holes that are both vertically and horizontally spaced from one another such that fuel passing downwardly through one hole must travel downwardly and horizontally to reach a subsequent hole.

5. A fuel tank according to claim 4, wherein said means for conducting and decelerating a flow of fuel comprises vertically spaced, generally horizontally oriented ribs in which respective ones of said holes are formed.

6. A fuel tank according to claim 1 including passage means communicating said downstream end of said fuel receiving area with said fuel storage area, and a filter disposed across an upstream side of said passage means.

7. A fuel tank according to claim 6, wherein said filter is arranged such that fuel flows in an upward direction therethrough.

8. A fuel tank according to claim 7 including a drain disposed in a floor of said tank at a location beneath said filter.

9. A fuel tank according to claim 8 including a buoyant material disposed above and downstream of said filter, said buoyant material having a hole therein for defining at least part of said passage means, and having means for confining said buoyant material for vertical floating movement in the fuel.

10. A fuel tank according to claim 9, wherein said buoyant material is connected to said filter, said buoyant material and said filter being permitted to float together in the fuel.

11. A fuel tank according to claim 9, wherein a wall of said housing means extends over said buoyant material and includes a second hole, said second hole being situated vertically above, and horizontally spaced from, said hole in said buoyant material to define said passage means together therewith.

12. A fuel tank according to claim 9, wherein said buoyant material is inclined relative to horizontal, said hole formed therein being situated adjacent a lower end of said buoyant material.

13. A fuel tank according to claim 1 including an inclined recess formed in a bottom of said fuel receiving area, and a drain communicating with said inclined recess for removing sediment.

14. A fuel tank according to claim 1 including a hose extending from said fuel outlet port and into said tank interior, a buoyant element disposed at an inner end of said hose, so that said inner end of said hose floats at least near a surface of fuel in said fuel storage area.

15. A fuel tank according to claim 14 including a filter disposed on said inner end of said hose.

16. A fuel tank and a liquid fuel-burning heater connected to said fuel tank, said fuel tank comprising:
    a tank body having a liquid fuel intake port communicating with an interior of said tank at an upper portion of said interior, and
    a wall arrangement dividing said tank interior into a fuel receiving area and a fuel storage area,
    said fuel receiving area communicating with said fuel intake port and including means for conducting a downward flow of liquid fuel from said intake port while decelerating the speed of the fuel,
    said fuel storage area communicating with a downstream end of said fuel receiving area at a location spaced below said fuel intake port, and
    a fuel outlet port communicating with said heater and with said fuel storage area and disposed below said fuel intake port.

17. A fuel tank comprising:
    a tank body having a liquid fuel intake port communicating with an interior of said tank at an upper portion of said interior,
    a wall arrangement dividing said tank into a fuel-receiving area and a fuel storage area,
    said fuel-receiving area including a fuel decelerating section extending along a side of said tank from a top to a bottom of said side and including vertically space, generally horizontally oriented ribs having vertically spaced holes through which inflowing fuel flows downwardly, said holes being vertically non-aligned so that fuel passing downwardly through one hole must travel downwardly and horizontally to reach a subsequent hole, whereby the inflowing fuel decelerates, said fuel-receiving area including a fuel intake compartment overlying a portion of a bottom of said tank and communicating with a lower end of said fuel-decelerating section downstream of said holes, said fuel intake area including:

a filter disposed above said bottom of said tank and oriented such that fuel received from said fuel-decelerating section flows upwardly through said filter, and a hole disposed in said wall arrangement above said filter for communicating said fuel intake compartment with said fuel storage area, said fuel storage area including an outlet port disposed below said fuel inlet port for the withdrawal of fuel.

18. A fuel tank according to claim 17 including a buoyant material overlying said filter and having a hole situated below and horizontally spaced from said hole in said wall arrangement, said wall arrangement arranged to confine said buoyant material for vertical floating movement in the fuel.

19. A fuel tank according to claim 18, wherein said buoyant material is attached to said filter to enable said buoyant material and filter to float together.

20. A fuel tank according to claim 18 including drains in said bottom of said tank in said fuel intake compartment sand said fuel storage area, respectively, for removing sediment.

21. A fuel tank according to claim 18, wherein said wall arrangement includes a plate underlying said filter and being inclined downwardly from an end of said located adjacent to where said hole in said buoyant material is disposed, so that inflowing fuel is constrained to flow beneath and around said plate to reach said hole in said buoyant material.

22. A fuel tank according to claim 17 including a hose extending from said fuel outlet port and into said tank interior, a buoyant element and a filter disposed at an inner end of said hose, so that said inner end of said hose floats at least near a surface of fuel in said fuel storage area.

* * * * *